F. BILLINGS & R. P. GREENLEAF.
LOADING MACHINE.
APPLICATION FILED JULY 19, 1915.

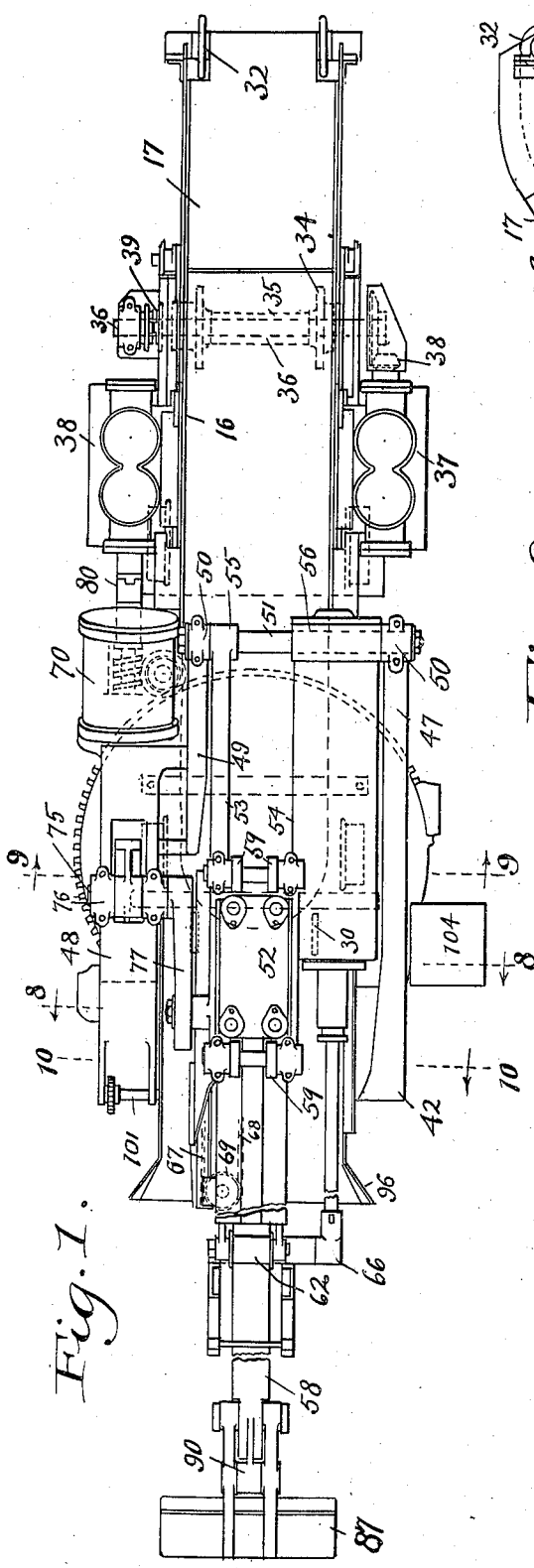

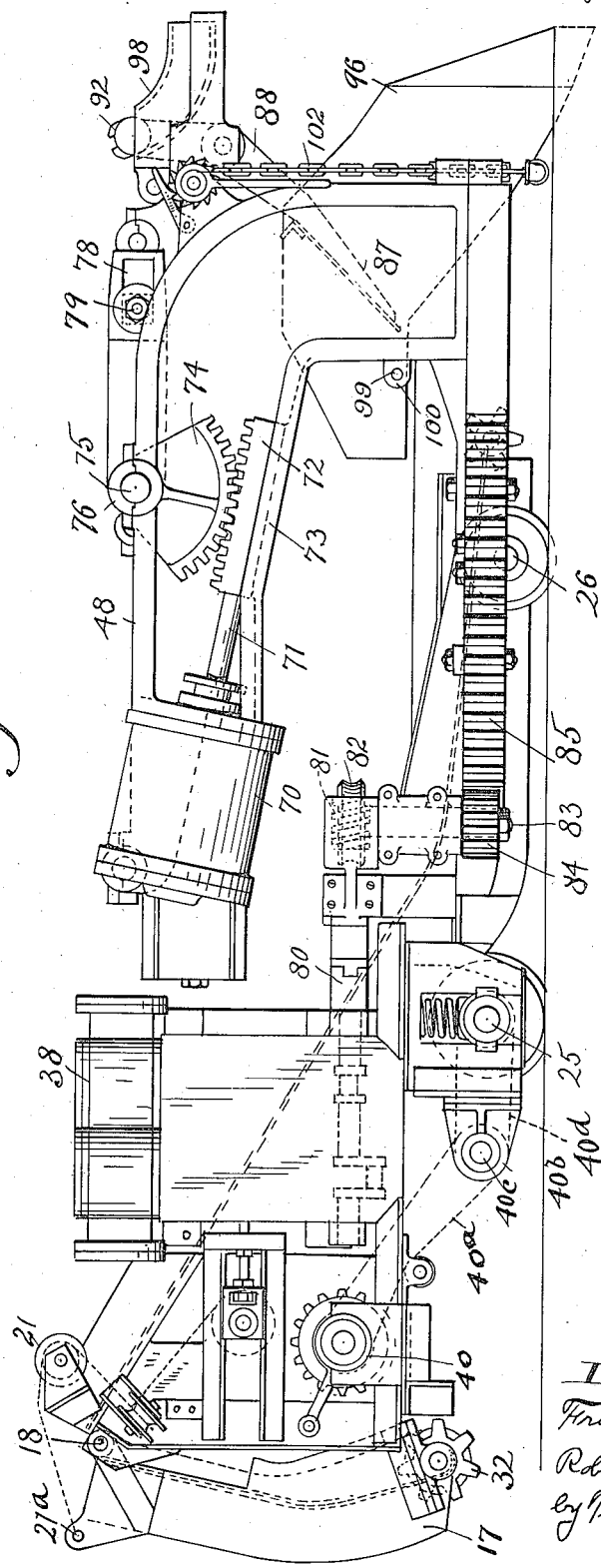

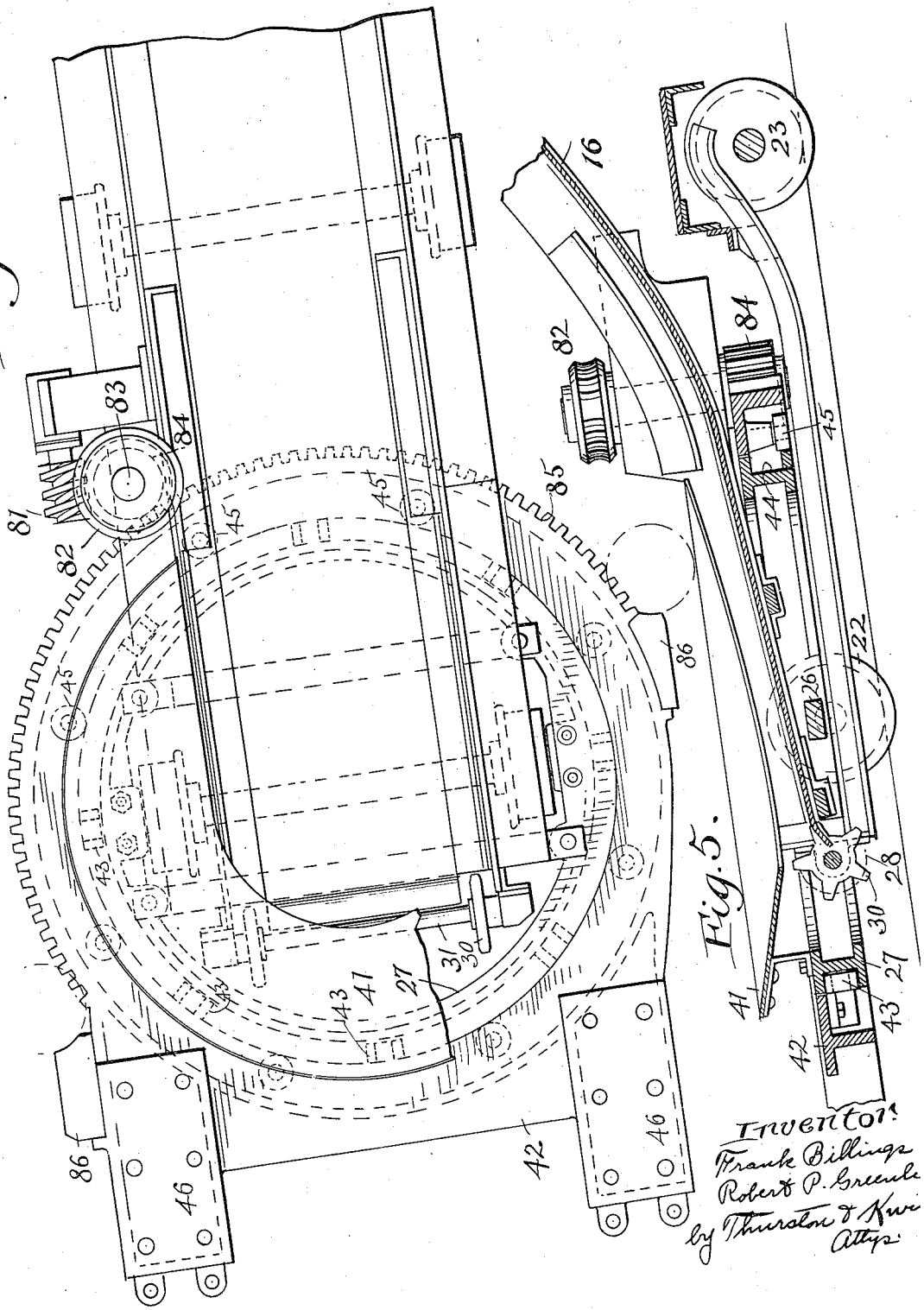

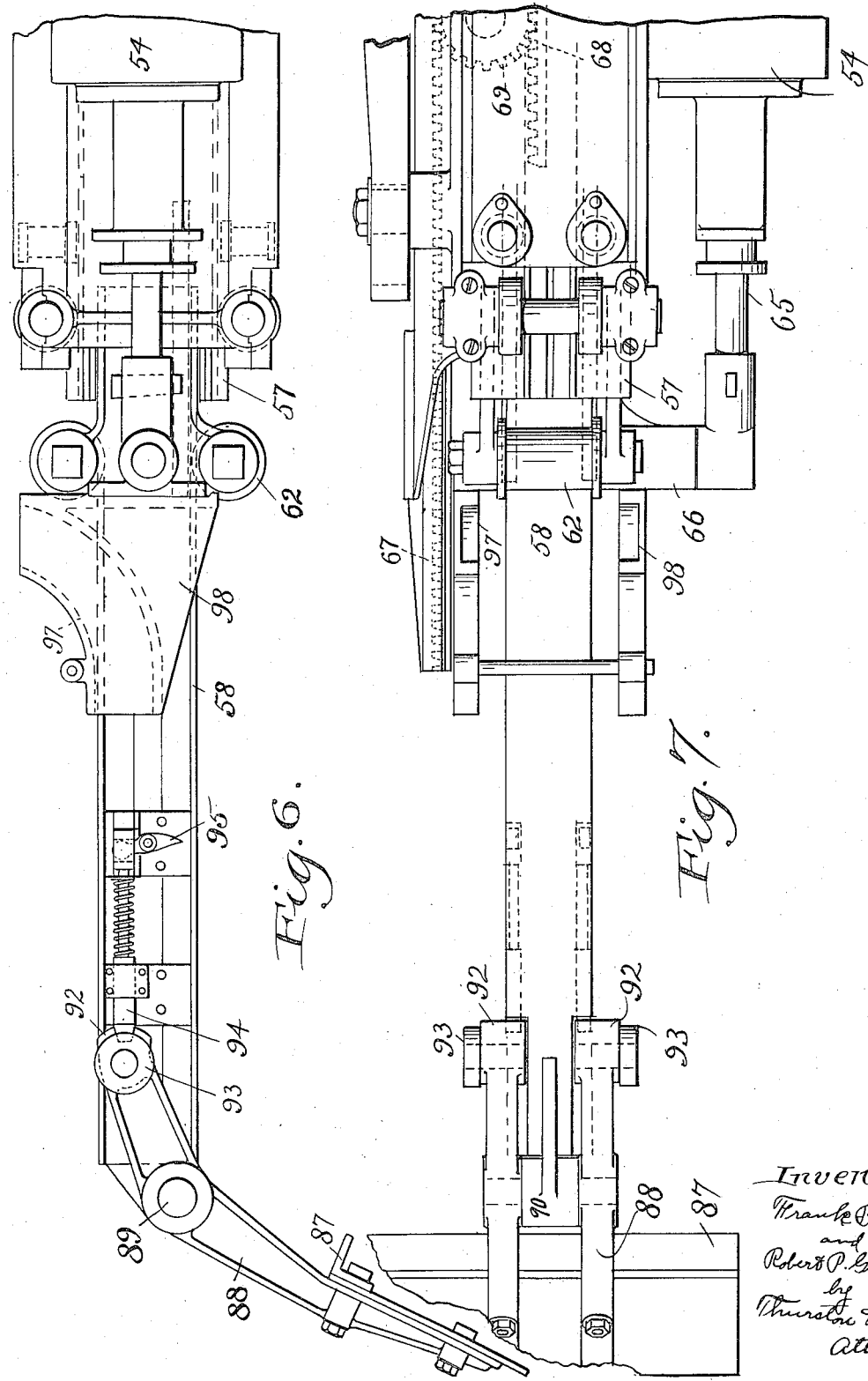

1,277,687.

Patented Sept. 3, 1918.
6 SHEETS—SHEET 5.

Inventor
Frank Billings and
Robert P. Greenleaf
by Thurston & Kwis
Attys.

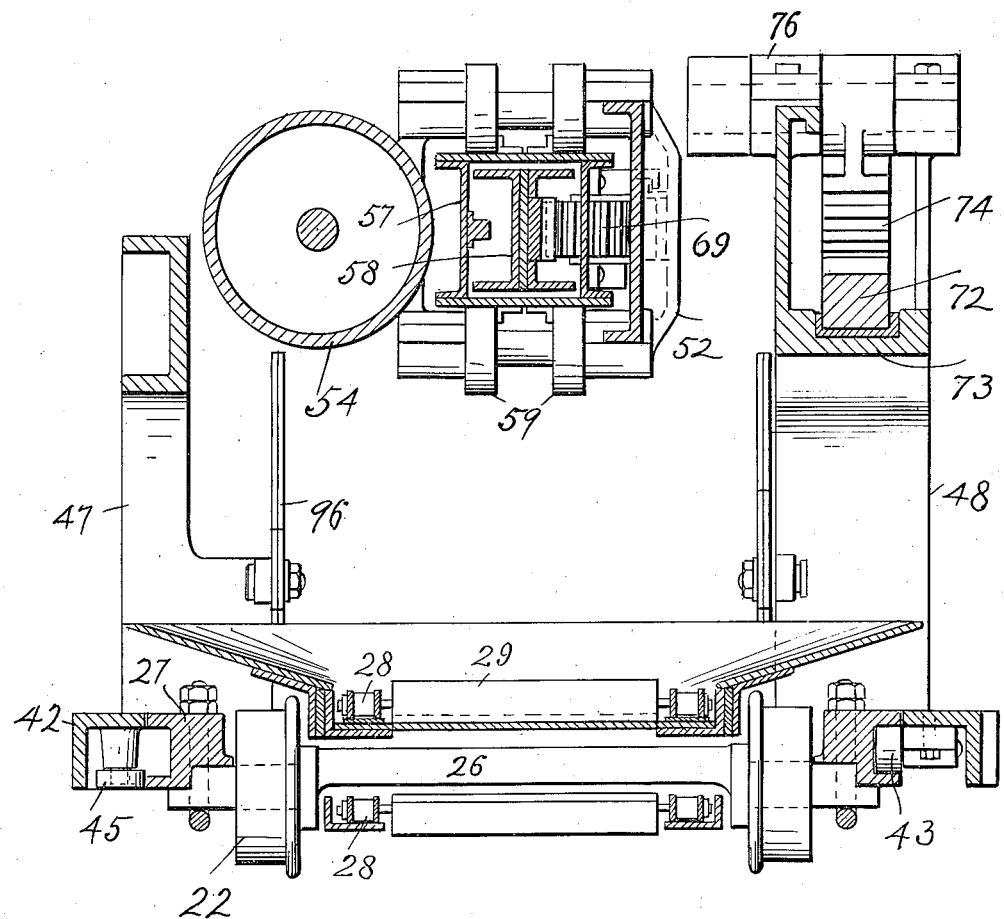

UNITED STATES PATENT OFFICE.

FRANK BILLINGS AND ROBERT P. GREENLEAF, OF CLEVELAND, OHIO; SAID GREENLEAF ASSIGNOR TO SAID BILLINGS.

LOADING-MACHINE.

1,277,687.  Specification of Letters Patent.  Patented Sept. 3, 1918.

Application filed July 19, 1915. Serial No. 40,593.

*To all whom it may concern:*

Be it known that we, FRANK BILLINGS and ROBERT P. GREENLEAF, citizens of the United States, and residents, respectively, of Cleveland, in the county of Cuyahoga and State of Ohio, and Cleveland, in the county of Cuyahoga and State of Ohio, have invented a certain new and useful Improvement in Loading-Machines, of which the following is a full, clear, and exact description.

This invention relates to a loading apparatus adapted particularly for use in mines, and in certain respects is an improvement over the construction disclosed in the patent granted to Frank Billings, No. 1,095,786, May 5, 1914, for "mining and loading apparatus," and in other respects is an improvement over the construction disclosed in the pending application of Robert P. Greenleaf, Serial No. 674,896, filed February 2, 1912, for "loading apparatus."

One of the objects of the present invention is to increase the efficiency and speed of operation of a loading machine of the character of those shown in the Billings and Greenleaf patent and application, and to render the same more compact, durable and flexible in use. More particularly the invention aims to decrease the head room or height of the operating parts and at the same time to provide ample space for moving and conveying material rearwardly through the machine. Additionally, the invention aims to eliminate the liability of the rear part of the reciprocating scraping mechanism projecting upwardly above the machine to such a height that it may strike and loosen overhead timber and the like. A still further object is to shorten the length of the swinging and scraping mechanism. Additional objects will be apparent from the detailed description.

The invention in one of its aspects resides in the location and manner of supporting the turn table, which in turn supports the reciprocating and scraping mechanism. The invention resides also in the manner of pivotally supporting the housing which receives the reciprocating ram; in the provision of a swinging hoe support which is carried by the ram; the arrangement and disposition of the conveyer, and in other details of construction and combinations and arrangements of parts which together with those specifically referred to will be described in the specification and set forth in the appended claims.

Figure 8:
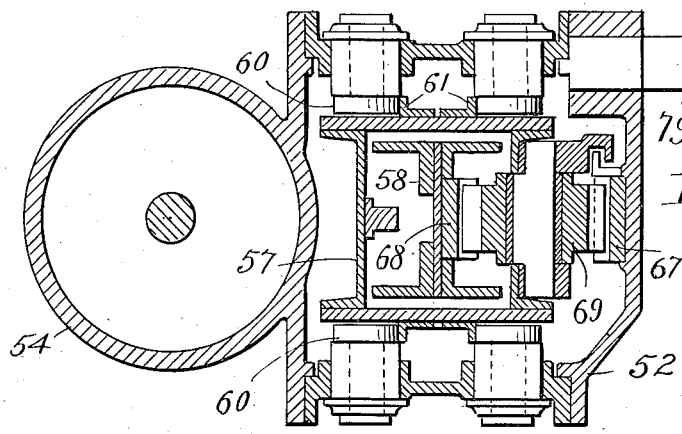
Figure 9:
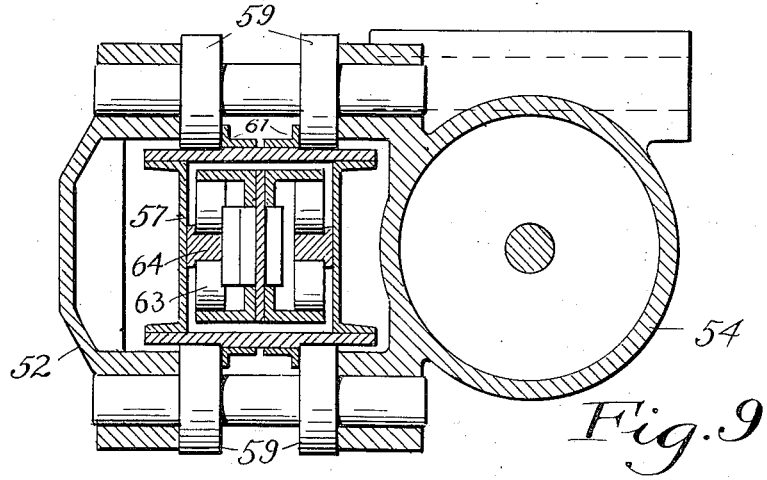
Figure 10:
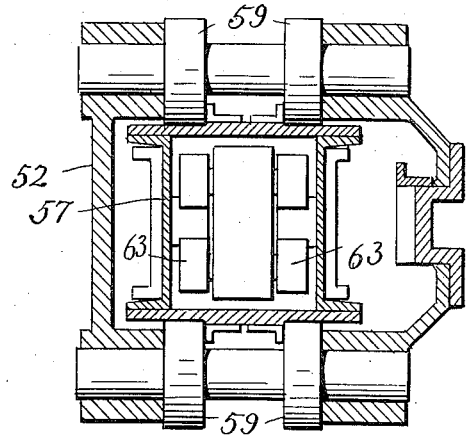

In the accompanying sheets of drawings wherein there is shown the preferred embodiment of the invention, Figure 1 is a top plan view of a machine with the ram extended; Fig. 2 is a side elevation of the same; Fig. 3 is a side elevation looking toward the side opposite to that shown in Fig. 2 and with the ram retracted and rear end of the conveyer swung downwardly; Fig. 4 is an enlarged detail plan view of the forward part of the machine with the ram and the housing removed and the other parts broken away for the sake of clearness; Fig. 5 is a vertical sectional view through substantially the center plane of the machine, showing the front part of the machine; Fig. 6 is a side elevation on an enlarged scale of the forward part of the ram and hoe, this view showing particularly the swinging hoe support and the means for swinging or oscillating same when the ram is reciprocated; Fig. 7 is a top plan view of the same; Fig. 8 is a sectional view through the ram and the cylinder of the ram reciprocating motor, the section being taken substantially along the irregular line 8—8 of Fig. 1 looking in the direction indicated by the arrows; Fig. 9 is a similar view substantially along the line 9—9 of Fig. 1 looking in the direction indicated by the arrows; Fig. 10 is a similar view substantially along the line 10—10 of Fig. 10 looking in the direction indicated by the arrows; and Fig. 11 is a vertical sectional view through the machine substantially along the line 11—11 of Fig. 2 looking in the direction indicated by the arrows.

Referring now to the drawings, it will be seen that the machine is provided with a frame 15, including a trough-like conveyer frame or chute 16 which is composed of upright sides and a bottom and which extends from the lower forward part of the machine upwardly and rearwardly, as shown particularly in Fig. 2. At the rear end of the conveyer frame or chute is a swinging extension 17 which is mounted to swing about an axis 18 so that it may be raised to operative position in line with the main part of the conveyer frame, as shown in Fig. 2, so that material may be discharged into a car 19, or may be swung downwardly along the rear end of the machine, as shown in Fig. 3. The means for shifting this conveyer extension may assume a variety of forms, but in this case it is shifted by a crank 20 connected to a shaft and flexible cables or the like passing about sheaves such as shown at 21 and connected at 21ª to a part projecting from the extension 17. As the means for shifting this conveyer extension does not constitute a part of the present invention, the shifting means is not shown in detail.

The entire machine is supported by front and rear track wheels 22 and 23 which are adapted to run along the mine track indicated conventionally at 24. The rear wheels 23 are carried by a rear axle 25 which is employed as a driving axle when the machine is to be propelled along the track, as will be explained subsequently. The front wheels 22 are mounted on a front axle 26 which extends across and at its ends is secured to diametrically opposite parts of a ring or annulus 27 to which the forward end of the frame is secured, the main portion of the axle being offset with respect to the ends which are secured to the ring as shown particularly in Fig. 11. This ring or annulus 27 constitutes a support for the hopper and the forward end of the conveyer as well as a support and track ring or guide for a turntable on which the main operating parts are supported.

The conveyer includes in addition to the frame or chute 16 a pair of side chains 28 and cross-pieces or flights 29 which extend across the chains and are designed to pull material deposited in the conveyer frame or chute up along the bottom thereof to the upper discharge end. (See Fig. 11). These chains pass about a pair of sprockets 30 mounted on a cross-shaft 31 at the forward end of the conveyer. At the upper end of the conveyer the chains pass about a pair of sprockets 32 and between the upper and lower ends they pass about idler sprockets 33 which may be adjusted to vary the tension of the chains and about a pair of driving sprockets 34 mounted upon a quill shaft or sleeve 35 (see Figs. 1 and 2) surrounding a shaft 36 supported by the frame at the lower rear part of the machine. A pair of fluid pressure motors or engines 37 and 38, preferably air motors, are supported on the frame on opposite sides of the rear portion of the conveyer, and one of these motors 37 drives the shaft 36 through beveled gearing 38. A doubled-faced clutch indicated conventionally at 39 is adapted, when in one position, to clutch the sleeve or quill 35 to the shaft 36 so that the motor 37 will drive the conveyer, and when in another position, is adapted to clutch the shaft 36 to a sprocket 40 (see Fig. 3) which is utilized when it is desired to propel the machine as a whole along the mine track. This sprocket 40 is connected by a chain 40ª to a sprocket 40ᵇ on an idler shaft 40ᶜ which is geared preferably by chain and sprocket gearing 40ᵈ to the rear axle 25 previously referred to.

Supported on the ring 27 is a hopper 41 of circular shape, and the front and side portions of which taper downwardly and inwardly toward an opening in the base of the hopper, which opening is directly over the forward part of the conveyer so that material deposited in the hopper by mechanism hereafter described will drop onto the conveyer and will be moved through the machine along the conveyer trough or chute.

Although the particular form or construction of the conveyer here shown is not at all essential to my invention, the arrangement and disposition of the same with respect to the other parts is of considerable importance. It will be noted that the conveyer frame extends down into the circular opening in the stationary track ring 27 and that the forwardly and rearwardly moving strands of the conveyer chains straddle or are on opposite sides of the front axle 26. This brings the conveyer and hopper very near the ground and is an important factor in determining the overall height of the digging and scraping parts of the apparatus.

Concentric with the track ring 27 and surrounding the same is a turntable 42 which is in the same plane with and is supported by the ring 27. This turntable which is designed to turn through an arc of more than 180° is rotatably supported by the track ring through the medium of a plurality of rollers including a number of spaced rollers 43 which are carried by the turntable on horizontally disposed spindles and engage in a peripheral groove 44 of the track ring 27, and a number of spaced rollers 45 which are carried by the turntable on vertical spindles and engage the lower peripheral edge of the track ring 27. The rollers 43 sustain the weight of the turntable and parts supported thereby or transmit vertical stresses while the rollers 45 centralize the turntable or transmit the lateral stresses.

In the prior Billings and Greenleaf constructions, shown in the beforementioned patent and application respectively, the turntable is supported at the upper part of the machine through the medium of a support carried by the frame and king bolt connection therewith. The necessity for a certain predetermined space between the upper turntable support and the rearwardly moving portion of the conveyer to provide necessary space for the material being conveyed, requires that the turntable be at a considerable height above the ground and that the housing and ram, of course, be still higher. With the present construction, however, wherein the middle of the turntable is open and wherein the conveyer dips down into the turntable and its supporting ring, and wherein the king bolt supporting means for the turntable is eliminated, the latter can be brought near the ground and a construction of very low overall height is made possible.

This turntable 42 carries all the reciprocating and rocking parts of the scraping mechanism. The manner in which these parts are supported upon the turntable will now be described. It will be observed that the forward part of the turntable is provided with two spaced bases or supports 46 (see Fig. 4) to which are securely fastened two heavy ram supporting arms 47 and 48, which are shown most clearly in Figs. 2 and 3. These ram supporting arms, which are preferably formed of rather heavy steel castings, extend upwardly from the supports or bases 46 and thence rearwardly. At the upper rear end of the arm 47 and at the upper rear end of an arm 49 which is secured to and virtually forms a continuation or inwardly offset extension of the arm 48, (see Fig. 1) are a pair of bearings 50 supporting a horizontal shaft 51 about which the reciprocating mechanism rocks or swings vertically to raise and lower the ram and the scraping hoe which is designed to be supported at the forward end thereof. It will be noted that this shaft 51 is above and somewhat to the rear of the rear part of the turntable. This shaft pivotally supports a rocking or swinging housing 52 which is a box-like structure adapted to receive the telescopic ram and is located a distance forwardly of the pivoting shaft 51, this housing being above the forward edge of the turntable and being between the upwardly and rearwardly extending ram supporting arms 47 and 48. Projecting rearwardly from this housing 52 is a supporting arm 53 and the cylinder of a ram operating fluid pressure motor 54, said arm and the cylinder being provided at their rear ends with bearings 55 and 56 which receive the shaft 51 and by which this housing is pivotally supported for vertical swinging movement. The cylinder 54 is formed integral with one side of the housing 52, and so far as the housing supporting functions of this cylinder are concerned it is the equivalent of the arm 53.

The housing receives a reciprocating ram composed of two sections, including an outer box-like section 57 and an inner I-shaped section 58, which sections move relative to each other and also relative to the housing. The outer section of the ram is supported from the housing through the medium of rollers 59, which engage the top and bottom sides of the outer ram section 57 so as to transmit vertical stresses, and other rollers 60 supported on vertical spindles and engaging the sides of angles 61 carried by the top and bottom sides of the outer ram section 57 so as to transmit the lateral stresses from the ram to the housing. These rollers are shown most clearly in Figs. 8, 9 and 10. The inner ram section 58 is supported from the outer section 57 by front rollers 62 which are carried by the outer ram section and engage the top and bottom sides of the inner ram section and by rear rollers 63 which are carried on the rear end of the inner ram section and engage centrally disposed rails 64 carried on the inner sides of the outer ram section. The ram is reciprocated by the motor 54 whose reciprocating piston rod or plunger is connected at 66 to the forward end of the outer ram section. The inner ram section is caused to move inwardly and outwardly at twice the speed of the outer ram section by two racks and a pinion, including a rack 67 carried by an arm projecting forwardly from the housing, a rack 68 on the side of the inner ram section 58, and a pinion 69 which is carried by the outer ram section 57 and engages both racks.

The ram and housing are adapted to be rocked or swung vertically about the axis of the shaft 51, which as before stated is supported at the rear ends of the ram supporting arms 47 and 49, by means of a motor, in this case a reciprocating fluid pressure motor 70 (see particularly Fig. 3), whose cylinder is bolted onto the rear end of the ram suporting arm 48 which extends upwardly and rearwardly from one of the bases or supports 46 of the turntable. This motor 70 is provided with a forwardly and downwardly inclined plunger 71, carrying a rack 72 which is adapted to reciprocate in a slideway 73 formed in the arm 48 (see particularly Fig. 11), and which engages a toothed segment 74 secured to a short rock shaft 75 supported in bearings 76 on the arm 48 about midway of the forward and rear ends thereof. This shaft 75 has secured to its inner end a crank arm 77 whose forward end has a slot 78 (see Fig. 3) in which engages a pin 79 (see particularly Fig. 8) rigidly fastened in a boss projecting from one side of the housing 52 near its forward end. When the arm 77 is rocked by the motor and rack and segment, the housing and entire ram are rocked or swung vertically. Not only does this arm 77 serve to rock the housing and ram, but it transmits vertical and lateral stresses from the ram and housing to the heavy ram supporting arm 48 and thus relieves the rear bearings of all severe stresses. For this reason this arm 48 and the pin 79, as well as the bearings for the shaft 75, are made quite massive.

I have already described how the ram is reciprocated or moved forwardly and rearwardly, and how it is rocked about a horizontal axis to raise and lower the forward end of the ram. This ram has one additional movement important to the operation of the machine, this being the horizontal swinging or turning movement which is given to the ram by turning the turntable. This turntable may be turned through an arc of slightly more than 180°, so that the hoe and ram may have a range of working movement not only in front of the machine but to the sides thereof as well, and this movement is imparted to the turntable by the motor 38 previously referred to. The shaft 80 of this motor (see particularly Fig. 3) extends forwardly from the motor and at its forward end is connected to a worm 81 which engages a worm wheel 82 fixed to a short vertical shaft 83 which at its lower end is provided with a pinion 84 engaging gear teeth 85 formed or provided on the periphery of the turntable, as shown most clearly in Fig. 4. This motor, which is of course reversible, admits of the turntable being turned rapidly in either direction. Stops or bumpers 86 (shown in Fig. 4) carried by the turntable, are adapted to engage the pinion and so limit the swinging movement of the turntable and parts carried thereby.

The forward end of the inner ram section 58 may be provided with a variety of working tools, the chief of which is a scraping hoe 87 by which loosened material may be scraped rearwardly onto the conveyer. However, the machine may be used for loosening, picking and hammering purposes, in which event the hoe will be removed and the required tool will be applied to the ram. When the hoe 87 is employed, it is preferably secured to a swinging support or carrier 88 composed of parallel arms mounted on a pin 89 extending through a boss or tool head 90 at the extreme forward end of the inner ram section 58. The upper ends of the arms 88 project upwardly and rearwardly beyond the pivoting pin 89 and are provided at their upper ends with bosses 92 (see Fig. 7) carrying rollers 93. When the hoe is in the act of scraping material rearwardly, and in fact throughout the major portion of the stroke of the ram in each direction, the arms constituting the swinging hoe support 88 are rigidly held in the position shown in Fig. 6 by means of a pair of pawls 94 spring-pressed forwardly and engaging in notches or openings provided in the bosses 92. At the rear ends of the pawls 94 are pivoted fingers 95, which, after the ram has been retracted a certain distance, and when the hoe 87 is near the forward edge of an inclined apron 96, engage projections on the outer ram section 57 and are rocked by said projections shifting the pawls 94 rearward out of engagement with the bosses at the ends of the hoe carrying arms. The projections which are stated to be on the outer ram section and are engaged by the pivoted fingers 95 may be of any suitable form and are simply parts of the outer ram section. These projections are shown by dotted lines in Figs. 6 and 7. They extend just beyond the dotted rollers of the housing in Fig. 6, and are shown extending just beyond and through the right hand pair of rollers in Fig. 7. Just before the pawls 94 are shifted as above stated the rollers 93 engage in upturned grooves or slots 97 of roller guides 98 constituting cams which guide the rollers 93 upwardly and rock the hoe supporting arms 88 so as to swing the hoe 87 rearwardly. This takes place when the ram is near the end of its inward movement and while the hoe is scraping the material up the apron or chute 96 into the hopper 41. In the early part of the forward or return movement of the ram the hoe and hoe support are swung outwardly to normal position, and just before the rollers leave the curved or cam grooves of the guides 98 the pivoted fingers 95 are released and the pawls 94 again engage in the grooves or notches of the bosses 92 so as to again lock the hoe in its normal position. This inward swinging movement of the hoe near the termination of the inner ram movement is of importance, for the reason that it causes the material to be moved up the inclined apron with less length of reciprocating movement than would be required with a rigidly supported hoe whose entire stroke consisted simply of a reciprocating movement. By giving the hoe the reciprocating movement and during a portion of the latter the rearward swinging movement, we are enabled to shorten the length of the digging mechanism over that which would be required with a rigid hoe.

It will be noted particularly from Figs. 2 and 6 that when the hoe supporting member or arms 88 are in their normal locked position, as when the ram is extended, the hoe is forwardly inclined. This angular position of the hoe with relation to its support is of importance, as it enables the lower edge of the hoe to reach down well into the lower corner of the breast of the mine and to remove material very cleanly from the mine.

The apron 9 or chute 96 previously referred to inclines upwardly from a point near the ground, and has its rear end arranged so as to discharge into the hopper 41. This chute or apron is carried by the turntable so as to turn therewith and so as to be always in the plane of the ram and hoe and in position to carry the material up and to discharge the same into the hopper regardless of the angle from which the material is scraped. In this case the apron is pivotally supported on pins 99 mounted in a pair of ears 100 on the lower parts of the ram supporting arms 47 and 48 (see Figs. 2 and 3), so that it can be elevated when the machine is being moved from one part of the mine to another. For the purpose of elevating or lowering the apron and for holding it in elevated position, we provide on the ram supporting arm 48 a shaft in the form of a capstan 101 (see Fig. 1) which can be turned in any suitable manner and which receives one end of an apron hoisting chain 102 which extends from the capstan downward beneath the apron and across to the opposite ends of the apron where the end of the chain is fastened, as at 103. Of course, the means for shifting this apron or chute may be of a form other than that here shown.

The seat for the operator is shown at 104, and within convenience of the operator when occupying this seat will be located the controlling levers for controlling the motors which drive or actuate the machine and give the different movements to the operating parts.

Not only is the overall height of the principal part of the machine made much lower than in the machines in the patent and application hereinbefore mentioned, but by reason of the fact that the housing is pivoted practically at the rear end of the reciprocating mechanism when it is in its most retracted position, the rear end of the ram when the ram is fully retracted and when the hoe is scraping material up the apron 96 does not project upwardly beyond the stationary parts of the machine. This is a very important advantage, because with this construction the undivided attention of the operator can be given to the front part of the machine and it will be unnecessary for the operator to shift the ram slowly during certain portions of the strokes as it would be if the rear end of the ram was liable to strike and loosen the overhead mine timber. When the ram is fully retracted the rear end thereof projects only slightly beyond the rear end of the tilting motor 70, and when the ram is inclined downwardly its greatest amount the end of the ram does not project upwardly beyond the motor 70.

While we have shown one embodiment of the invention which operates with very high efficiency, and which has the other necessary or desirable characteristics as to compactness, durability and efficiency, nevertheless, as is apparent, certain modifications may be made in the construction and arrangements of parts without affecting the operation of the machine as a whole. For example: It is not necessary that air motors be employed, as other motors such as electric motors may be used wherever electric power is available. Furthermore, it is not necessary that the conveyer be of the form here shown, as a belt conveyer might be employed particularly for use in handling certain materials. It will be obvious, also, that instead of having the conveyer here shown discharge into cars 19 the material may be discharged into an auxiliary conveyer, which in turn may discharge into the cars. We, therefore, do not desire to be confined to the exact details shown, but aim in the claims to cover all modifications which do not involve a departure from the spirit and scope of the invention.

Having thus described our invention, what we claim is:—

1. In a loading machine, a frame, a turntable supported at the lower front part of the frame to turn about its center, a conveyer supported by the frame independently of the turntable and having its lower front portion extending over the rear part of the turntable, the forward portion of the turntable being beyond the front end of the conveyer, a hopper above the forward end of the conveyer, an inclined apron extending from in front of the turntable upwardly and rearwardly over the forward portion thereof so as to discharge into the hopper, and means supported by the turntable for moving material rearwardly up said inclined apron to the hopper.

2. In a loading machine, a frame, a turntable supported at the lower part of the frame, a conveyer having a portion extending within and partly across over the turntable, and means supported by the turntable and movable therewith about a substantially vertical axis for moving material rearwardly up over the turntable and onto the conveyer.

3. In a loading machine, a frame, a turntable supported at the lower part of the frame to turn about its center, a conveyer supported by the frame independently of the turntable and having its lower front portion extending over the rear part of the turntable, the forward part of the turntable being beyond the front end of the conveyer, a hopper positioned over the forward end of the conveyer, an inclined apron movable with the turntable and extending from in front thereof upwardly and rearwardly over the front part of the same so as to discharge into the hopper, and means supported by the turntable for moving material up along said apron to the hopper said means including a ram and hoe mounted for vertical and forward and rearward movements.

4. In a loading machine, a frame, a turntable supported at the lower front part of the frame and provided with a central opening, a hopper supported over said turntable, a conveyer having a portion extending into said opening of the turntable and movable therewith about a substantially vertical axis beneath the hopper, and means carried by said turntable for moving material rearwardly into said hopper.

5. In a loading machine, a frame, an annular supporting ring at the lower front part of the frame, an annular turntable ring concentric with said supporting ring and supported thereby, a conveyer extending from the upper rear part of the machine downwardly and forwardly and having its forward end extending into the inner opening of the turntable ring; and material moving mechanism supported by and movable about a substantially vertical axis with said turntable, for moving material onto said conveyer.

6. In a loading machine, a frame, a supporting ring fixed relative to the frame, a turntable ring carried by the supporting ring, a hopper mounted on the supporting ring, a conveyer having a portion extending down into the annular space within the turntable ring, and material moving mechanism supported by said turntable.

7. In a loading machine, a frame, a stationary ring supported at the lower front part of the frame, a turntable in the form of a ring surrounding the stationary ring and supported thereby, a conveyer including a flexible element having its forward portion traveling beneath the rings up through the rings and rearwardly over the rings, and means carried by said turntable for moving material onto the conveyer.

8. In a loading machine, a frame, a stationary ring connected thereto, a rotary ring surrounding the stationary ring, supporting rollers carried by one of the said rings and engaging the other ring, a conveyer having a portion extending beneath, through and over the two rings, and material moving mechanism carried by said rotary ring for moving material onto said conveyer.

9. In a machine of the character described, a frame, a turntable supported at the lower front part of the machine, a support carried by said turntable projecting upwardly and rearwardly from the front part thereof, a housing pivotally connected to the rear part of said support and a reciprocating operating ram carried by said housing.

10. In a loading machine, a frame, a turntable mounted at the lower front part of the frame, a pair of spaced arms fixed relative to the turntable and projecting upwardly and rearwardly from the front part of the turntable, a housing between and pivotally connected to the rear portions of said arms, and a reciprocating ram mounted in said housing.

11. In a loading machine, a frame, a turntable at the lower front part of the frame, supporting means secured to the turntable near the front portions thereof and projecting rearwardly from and over the turntable, a housing pivotally connected to the rear portion of the supporting means, and material moving mechanism supported by the housing.

12. In a loading machine, a frame, a turntable supported at the lower front part of the frame and provided with a support extending upwardly and rearwardly to the rear of the turntable; a reciprocating ram, a tilting housing receiving said ram and having a pivotal connection with said support at the rear of the turntable and at a point adjacent the rear end of the ram when retracted.

13. In a loading machine, a frame, a material moving member, a reciprocating ram supporting the same, a housing receiving said ram, a turntable having an upwardly and rearwardly projecting support for the housing, and means projecting rearwardly from said housing and having a pivotal connection with said support.

14. In a loading machine, a frame, a turntable at the lower front part of the frame, said turntable having a supporting member projecting upwardly and rearwardly from the front part thereof, a reciprocating ram, a housing over the front portion of the turntable and receiving said ram, said housing having means projecting rearwardly therefrom and pivotally connected to the rear portion of said supporting member.

15. In a loading machine, a frame, a turntable at the lower front part of the frame, a pair of arms projecting upwardly and rearwardly from the front part of the turntable to substantially the rear part thereof, a housing over the front part of the turntable and having rearwardly projecting arms pivotally connected to the arms on the turntable, a ram mounted for reciprocating movement in the housing, and a material moving member carried by the ram.

16. In a loading machine, a frame, a turntable supported thereby, a tilting housing supported by the turntable above the same, a reciprocating ram and a material moving member supported by the housing, and a conveyer for moving material rearwardly through the frame and having its receiving portion between the turntable and the housing.

17. In a loading machine, a frame, a turntable supported by the frame, a hoe and a supporting ram carried by the turntable for scraping material rearwardly, an inclined apron at the forward end of the machine up along which the material is adapted to be moved by the hoe, and a conveyer supported by the frame independently of the turntable and having its receiving portion extending between the turntable and the ram and adapted to receive material from the apron.

18. In a loading machine, a frame having a material receiving element, a ram supported by the frame and provided at its outer end with a hoe, means for reciprocating the ram so that during the strokes of the ram in one direction material will be moved by the hoe toward the material receiving element, and means acting during the latter part of the material moving strokes of the ram to swing the hoe relative to the ram in the direction that the material is being moved.

19. In a loading machine, a frame, an inclined apron at the front end of the frame, a reciprocating ram, a hoe carried by said ram adapted to move material up along said apron, and means for causing the hoe to swing inwardly relative to the ram when the hoe is scraping the material up the apron.

20. In a loading machine, a frame, a reciprocating ram supported by the frame, a hoe pivotally supported by the ram, means for reciprocating the ram so that during the strokes in one direction the material will be moved toward the frame, and means carried by said ram and coöperating with said hoe for causing the hoe to be swung toward the frame during a portion of the movement of the ram toward the frame, and to swing in the reverse direction during a portion of the movement of the ram away from the frame.

21. In a loading machine, a frame, a reciprocating ram supported by the frame, a hoe pivotally supported at the outer end of the ram, means holding said hoe rigid with respect to the ram during a portion of the material moving stroke thereof, and means automatically causing the release of the hoe prior to the termination of said stroke so that it may be swung relatively to the ram during another portion of the same stroke.

22. In a loading machine, a frame, a reciprocating ram supported by the frame, a hoe pivotally supported at the outer end of the ram, means holding the said hoe in fixed position relative to the ram during a portion of the material moving stroke of the ram, and means for positively swinging the said hoe inward during the latter portion of the material moving stroke of the ram.

23. In a loading machine, a frame, a telescopic reciprocating ram composed of inner and outer sections, a hoe, supporting means for the hoe pivotally connected to the outer end of the inner section, and means carried by said outer section of the ram adapted to cause said hoe to swing on its pivotal axis when the inner section reaches a certain point with reference to the outer section.

24. In a loading machine, a reciprocating ram, a housing supporting said ram and provided with a reciprocating motor for reciprocating the ram, and a support for the housing, the cylinder of said motor being rigid with the housing and projecting rearwardly therefrom and at its rear end being pivotally connected to said support.

25. In a loading machine, a reciprocating ram, a tilting housing receiving the ram, a reciprocating motor for reciprocating the ram in the housing, said motor having a cylinder extending rearwardly beyond the housing, and a pivotal support for the housing, the rear end of said cylinder being pivoted to said support.

26. In a loading machine, a tilting housing, a support therefor at the rear of the housing, means projecting rearwardly from the housing and pivotally connected to the support, a swinging crank arm connected to the side of the housing at a distance forwardly of its pivotal axis, and a reciprocating ram in the housing.

27. In a loading machine, a tilting housing, a support to which said housing is pivotally connected at a distance to the rear of the housing, and means for tilting the housing comprising a shaft and a swinging crank arm carried by said support and connected with the housing.

28. In a loading machine, a frame, a turntable at the lower front part of the frame, a pair of arms projecting upwardly from the turntable, a tilting housing between and pivotally connected to the rear portions of the arms, and means supported by one of said arms and connected to said housing for tilting the housing and for transmitting stresses from the housing to said arm, and a ram mounted in the housing.

In testimony whereof we hereunto affix our signatures in the presence of two witnesses.

FRANK BILLINGS.
ROBERT P. GREENLEAF.

Witnesses:
G. A. HENDRICKSEN,
L. P. PHILLIPS.